United States Patent
Arye et al.

(10) Patent No.: US 8,094,607 B2
(45) Date of Patent: Jan. 10, 2012

(54) METHOD AND SYSTEM FOR SAVING BANDWIDTH DURING BROADCASTING/MULTICASTING

(75) Inventors: Ram Arye, Rishon Lezion (IL); Emanuel Fleishman, Tel Aviv (IL); Shahar Gorodeisky, D.N. Merkaz (IL)

(73) Assignee: Celtro Ltd, Petach Tikva (IL)

( * ) Notice: Subject to any disclaimer, the term of this patent is extended or adjusted under 35 U.S.C. 154(b) by 87 days.

(21) Appl. No.: 12/376,912

(22) PCT Filed: Jul. 24, 2007

(86) PCT No.: PCT/IL2007/000929
§ 371 (c)(1),
(2), (4) Date: Feb. 9, 2009

(87) PCT Pub. No.: WO2008/020428
PCT Pub. Date: Feb. 21, 2008

(65) Prior Publication Data
US 2010/0172378 A1    Jul. 8, 2010

Related U.S. Application Data

(60) Provisional application No. 60/822,505, filed on Aug. 15, 2006.

(51) Int. Cl.
*H04J 3/08* (2006.01)
(52) U.S. Cl. .......................... 370/326; 370/345; 370/442
(58) Field of Classification Search .................. 370/468, 370/473, 474, 476, 478, 479, 480, 498, 509, 370/510, 511, 512, 513, 514, 521, 523, 326–349, 370/431–442
See application file for complete search history.

(56) References Cited

U.S. PATENT DOCUMENTS

| | | | |
|---|---|---|---|
| 5,126,739 A * | 6/1992 | Whiting et al. | 341/106 |
| 5,526,363 A * | 6/1996 | Weiss et al. | 370/477 |
| 5,905,727 A | 5/1999 | Christensen et al. | |
| 6,374,266 B1 * | 4/2002 | Shnelvar | 1/1 |
| 2002/0071438 A1* | 6/2002 | Singh | 370/398 |
| 2004/0160983 A1* | 8/2004 | Kuskin et al. | 370/471 |
| 2005/0004954 A1* | 1/2005 | Soule, III | 707/203 |
| 2005/0117610 A1* | 6/2005 | Chevallier et al. | 370/521 |
| 2006/0092867 A1 | 5/2006 | Mueller et al. | |
| 2007/0183330 A1 | 8/2007 | Salt | |

FOREIGN PATENT DOCUMENTS

IL    WO9967886    12/1999

* cited by examiner

*Primary Examiner* — Kwang B Yao
*Assistant Examiner* — Juvena Loo
(74) *Attorney, Agent, or Firm* — Smith Risley Tempel Santos LLC; Gregory Scott Smith

(57) ABSTRACT

Multi-channel network communication is improved by reducing the amount of data that is transmitted over connections that can stem from a similar source. Content of data packets transmitted from the source are reduced and the result is compared to previously transmitted data packets. If identical packets are found, then only an identification of the packet is transmitted. At the receiving side, the identification is used to identify a previously received data packet and use that as though it was the recently received packet. If a similar packet is identified, then the identification of the similar packet, along with change information is transmitted to the receiving side.

17 Claims, 5 Drawing Sheets

METHOD AND SYSTEM FOR SAVING BANDWIDTH DURING BROADCASTING/MULTICASTING

CROSS-REFERENCE TO RELATED APPLICATIONS

This application is a United States Non-Provisional Application filed under 35 U.S.C. 371 that claims the benefit of the filing date of United States Provisional Application for Patent that was filed on Aug. 15, 2006 and assigned Ser. No. 60/822,505, through International Application Number PCT/IL2007/000929 which was filed on Jul. 24, 2007, both applications are incorporated herein by reference in their entirety.

BACKGROUND

The rapid evolution of communication networks, including wireless communication networks for mobile communications, creates a demand for increasing bandwidth utilization efficiency. This need has been seen in a variety of communication network technologies, such as but not limited to, Global System for Mobile communications (GSM) networks, 3G networks, etc. A common communication session may be composed of several types of data (also referred to as media): voice, video, computer data, signaling, etc. In addition, a single connection between two points, a source and a destination of a session, may be conducted over several type of networks: PSTN, TDMA, FDMA, ATM, IP, CDMA, cellular networks (1G or 2G or 3G), microwave links, as well as others and hybrids of one or more of these network types. In addition to the versatility that is mentioned above, a certain type of data may further be compressed or encrypted. The result of the above complexity is that a single communication connection between two points on the network may be based on a plurality of networks standards and communication protocols, compression standards, and encryption methods.

One common topology between a central location and a plurality of users can have a shape of a tree. In such architecture, a central point may be connected to one or more intermediate nodes. Further, each intermediate node may be connected to one or more other intermediate nodes and/or to one or more end user devices (for instance terminals). For example, in a 2G cellular network, a central node can be a BSC (base station controller) and an intermediate node can be a BTS a base transceiver stations (BTSs). In a 3G network, a central node can be a Radio Network Controller (RNC) and an intermediate node can be a node base station (Nb), for example. Another common topology can have a shape of a ring in which a central point (RNC or BSC, for example) and an intermediate node (BTS or Nb, for example) are connected to the ring. Exemplary terminals can be a cellular phone, a PDA with cellular capabilities, or any other computerized device that can generate and/or receive audio, video, data or any combination of those via a communication network, such as but not limited to, a cellular network.

Usually, a communication line between a central point and an intermediate node can carry a plurality of communication sessions between one or more other intermediate nodes and/or one or more terminals. Different types of networks and protocols can be used over such a communication line. The communication line can be based on Time Division Multiplexing Access (TDMA), Code division multiple access (CDMA), Addressing Time Multiplexing (ATM), Ethernet, etc. Each communication line can be divided into a plurality of channels. Each channel can be dedicated to a single connection between two terminals. There are some communication protocols in which a channel can be divided into two or more sub-channels. Each sub-channel can be dedicated to a single connection (session). Usually, the data transportation over a connection between an intermediate node and a central node can be organized in frames (packets, cells, chunks, sub-frames, etc). Each frame can have a header and a payload.

There are occasions in which similar information is transmitted over a plurality of channels or sub-channels around an interval of time. For example, this can occur when a plurality of users, which are connected via the same intermediate node, surf the same web-page, or listen to the same broadcast, advertising, content information, etc. Another exemplary occasion of transmitting similar data can occur in some networks, for example in a cellular 3G network, in which a soft handoff or handover (SHO) method is used for transferring a user from one Nb or a sector of Nb to another Nb or a sector within the same cell (Nb). For example, in CDMA systems, a cell can comprise one or more sectors of coverage (usually three). Each sector can produce data targeted toward the same user via independent transmitters that are used to transmit signals through antennas pointed in different directions. The set of sectors to which the terminal is currently linked to is referred to herein as the "active set". A soft handoff occurs when a CDMA terminal adds a new sufficiently-strong sector to its active set while the radio link with the previous one or more sectors is not broken before a link is established with a new sector—this type of handoff is described as "make before break".

In such cases, the communication line between the central node and the intermediate two or more nodes (sectors of the same cell, for example) may carry the similar data more than once (over different channels or sub channels) around the same interval of time. Repeating the transmitting of similar information over the same communication line bites off the bandwidth of overloaded communication lines.

Therefore, there is a need for a system and method for reducing the amount of times that similar data is transferred between two nodes over a plurality of different channels or sub-channels. The system can remove the repetitive data at ingress to a communication line and reconstruct it at the exit of the communication line. Such a system can improve bandwidth utilization over the communication line that connects a central node and an intermediate node.

BRIEF SUMMARY OF EXEMPLARY EMBODIMENTS OF THE INVENTION

Exemplary embodiments of the present invention seek to provide a novel apparatus and improved methods for reducing the number of times that the similar data is transmitted between a central node and an intermediate node over a plurality of channels or sub-channels. An exemplary embodiment of the present invention can comprise a transmitting module and a restoring module. The transmitting module can be installed in ingress of a communication line (a bearer), at the central node, and the restoring module can be installed at the other end of the bearer, at the intermediate node. In this application the terms "communication line" and "bearer" are used interchangeably. Henceforth, the description of the present invention may use the term 'bearer' as a representative term for any of the above group.

An exemplary transmitting module can be capable of intercepting the data transportation over the bearer; identifying similar chunks of data that are transferred around the same time over different channels or sub-channels between two points; and continuing the transmission of the data on a reference channel/sub-channel while removing the similar chunks of data from the other channels/sub-channels. On the other side of the connection line, an exemplary restoring module is capable of reconstructing the removed data by copying relevant chunks of data from the reference channel/sub-channel to the other channels/sub-channels. Throughout this description, the terms "channel" and "sub-channel" are used interchangeably. Henceforth, the description of the present invention may use the term 'channel' as a representative term for any of the above group. A chunk of data can have a few bytes up to a few hundreds of bytes, for example.

Each module, the transmitter module and the receiver module, can comprise a plurality of historical buffers, one per each channel or sub-channel. An exemplary historical buffer can be implemented by a cyclic buffer. Other exemplary historical buffers (HB) can be implemented by a FIFO, for example. Each HB can store a plurality of consecutive chunks of data that have been transferred via its associated channel. An exemplary number of stored chunks in an HB can be in the range of a few tens to a few thousands of chunks, for example. Upon receiving a chunk of data at one of the channels, the received chunk can be stored in the next address of the HB of the channel. Then, the HBs are searched for an entry that stored a similar chunk of data. If such an entry is found in an HB of another channel or in the same channel, then the received chunked of data can be modified, its content being replaced by the identification of or the ID number of the HB and the entry in the HB that includes the similar chunk. If the similar chunk is not identical to the received chunk of data, the modification of the received chunk can also include information that identifies the difference between the received chunk and the replacing similar chunk. In an alternate exemplary embodiment of the present invention, the modification information pertaining to the received chunk can be sent over a signaling line between the transmitting module and the restoring module.

Another exemplary transmitting module, in order to accelerate the searching process, can calculate a hash value for each received chunk of data. An exemplary hash value can be a cyclic redundancy check (CRC) value for example, a checksum value of a predefine number of bytes of the associated cyclic buffer starting from the received data chunk, etc. When a new data chunk carried by the associated channel is stored in the HB, the oldest data chunk is removed and one or more hash values can be calculated for the new content of the HB, or part of the HB. Each hash value can be calculated on a shifted data of one byte, for example, compare to a previous calculation (humming window). In some embodiment of the present invention, the hash value is calculated just for the received chunk. The new hash values are stored in the Hash Historical Buffer (HHB) of the channel while removing the oldest hash. An exemplary Hash HB can have a similar length as the HB and their pointers are synchronized.

Then, the Hash HBs are searched for an entry that stored a similar hash value as one of the hash values that were calculated for the received data chunk. If such an entry is found in the Hash HB of another channel (or in the same channel), then the pointer of the similar hash value in the Hash HB is used to access and retrieve the similar chunk in the HB of the same channel. The received chunk and the similar chunks can be compared to determine the degree of similarity between them. If the two chunks are similar, then the received chunk can be modified by replacing the content with an indication of the ID number of the HB and the entry in the HB that includes the similar chunk. If the similar chunk is not identical to the received chunk of data, then the modifying information can also identify the difference between the received chunk and the replacing similar chunk.

Yet in other exemplary embodiment of the present invention, an indexed matrix can be used instead of the plurality of Hash HBs. The indexed matrix can have an associated entry for each possible hash value. Each entry in the index matrix can be used to store pointing information to one or more received chunks that have a calculated hash value that is identical to the hash value that is associated with the entry. Exemplary pointing information can include the ID number of the relevant HB and the location (pointer to the location) of the chunk having the same hash number.

Upon receiving a chunk in the transmitting module, the chunk is stored in its channel HB; one or more hash values are calculated; an entry that is associated with each hash value is searched in the indexed matrix; and pointing information pertaining to the received chunk in its HB is added to the entry. The pointing information may include an indication on the shift (offset) from the beginning of the HB. Chunks that are pointed to by the entry can be retrieved from their HB, according to the pointing information and be compared to the received chunk and one of those chunks can be selected as a similar chunk. After selecting the similar chunk, the received chunk can be modified by replacing its content with an indication of the ID number of the HB and the entry in the HB that includes the similar chunk. If the similar chunk is not identical to the received chunk of data, the modifying information can also include the difference between the received chunk and the replacing similar chunk.

The modified chunk or the received chunk (when a similar chunk was not found) can be transmitted to the other side of the bearer toward the receiver module. For each channel, an exemplary receiver module may intercept the received transportation from the transmitting node and search for an indication that a received chunk has been manipulated. If an indication of manipulation was not found, the chunk is stored in an associated received HB (RI-IB) of the channel and is transferred toward its destination. If an indication that the chunk has been manipulated is found, the receiver module can start reconstructing the manipulated chunk. Reconstructing can be done by retrieving a similar chunk from one of the RHBs according to pointing information that is embedded within the received modified chunk. If the modified chunk includes a difference value, the difference value is added to the retrieved similar chunk to reconstruct the chunk. The reconstructed chunk can then be stored in the associated RHB and the reconstructed chunk can be transferred toward its destination.

The transmitting module and the restoring module maintain synchronization between their respective HBs. The synchronization can be verified periodically and/or according to activities associated with the data transportation. For example, synchronization verification can be invoked once per a certain amount of number of chunks being transferred over the connection, or when an error is detected, etc.

The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific exemplary embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF THE SEVERAL VIEWS OF THE DRAWING

Exemplary embodiments of the present invention will be understood and appreciated more fully from the following detailed description, taken in conjunction with the drawings in which.

DETAILED DESCRIPTION OF VARIOUS EMBODIMENTS

Turning now to the figures in which like numerals represent like elements throughout the several views, exemplary embodiments of the present invention are described. For convenience, only some elements of the same group may be labeled with numerals. The purpose of the drawings is to describe exemplary embodiments and not for production. Therefore features shown in the figures are chosen for convenience and clarity of presentation only.

Figure 1:
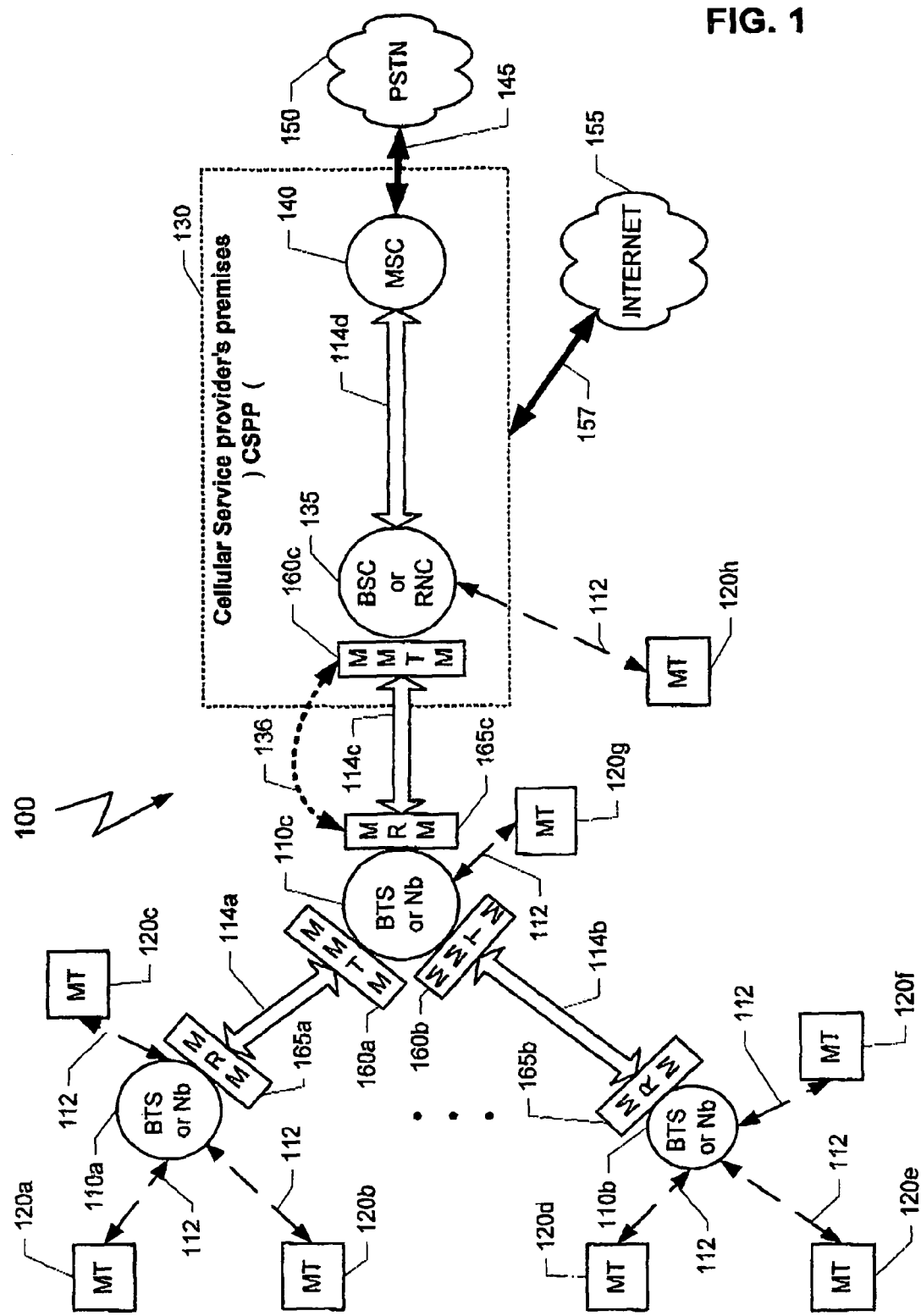
FIG. 1 is a simplified block diagram illustration of an exemplary portion of a communication network in which an exemplary embodiment of the present invention is used.

FIG. 1 illustrates a block diagram of a portion of an exemplary cellular network 100. The cellular network 100 may comprise a plurality of base transceiver stations (BTSs) 110a-c and a Cellular Service Provider Premises (CSPP) 130. A common BTS 110a-c wirelessly 112 connects mobile terminals (MT) 120a-g serviced by the network 100. The BTSs 110a-c are connected to a regional base station controller (BSC) 135, which is located at the CSPP 130, through a plurality of links 114. Links 114a-d may comprise cable wires (e.g. the E1 link), fiber optics, or other communication links, such as wireless omni-directional links, Microwave links, etc. The transportation over links 114a-d may be based on different types of communication protocols, including but not limited to ISDN, ATM, Internet Protocol (IP), etc. Exemplary MTs 120a-h can include a cellular phone, a PDA with cellular capabilities, or any other computerized device that can generate and/or receive audio, video, data or any combination of those via a cellular network.

At the CSPP 130, one or more BSCs 135 may be connected to a mobile switching center (MSC) 140. Among other tasks, the MSC 140 may serve as an interface between the cellular network 100 and one or more Public Switched Telephone Networks (PSTN) 150. The MSC 140 may comprise one or more codec devices at a Transcoder Rate Adapter Unit (TRAU), for example. The codec may be used to compress (encode) audio coming from a regular telephone via the PSTN 150 and connection 145 and targeted to one of the MTs 120a-h that are connected over network 100. The codec at the MSC 140 may be used as an initiator of a compressed audio or as a receiving entity (destination) for a compressed audio depending on the direction of the transportation. There are some embodiments in which a BSC 135 may have some of the functionality of the MSC 140. In addition, the CSPP 130 may be connected to the Internet 155 via connection 157. At the CSPP 130, the IP transportation toward or from an MT 120 is processed by different modules, such as, but not limited to, an SGSN, a GGSN, etc. which are not shown in the drawings. As is well known in the art, an SGSN refers to a Serving GPRS Support Node which takes care of some important tasks, including routing, handover and IP address assignment. The GGSN refers to a Gateway GPRS Support Node and is the "last port of call" in the GPRS network before a connection between an ISP or corporate network's router occurs. The GGSN is basically a gateway, router and firewall rolled into one. It also confirms user details with RADIUS servers for security, which are usually situated in the IP network and outside of the GPRS network.

In a 3G network, the BTSs 110a-c are replaced by node base stations (Nb) and the BSC 135 is replaced by a Radio Network Controller (RNC). Within the context of this description, the BTS and/or Nb can be referred to as a cell. There are locations or regions in which a cellular service provider may simultaneously serve or support two or more types of cellular networks (i.e., 1G and/or 2G and/or 3G). When this occurs, one or more communication links 114a-d may carry the transportation of the two or more cellular networks. For example, suppose that cell 110a is a BTS and cell 110b is an Nb. In this example, the communication link 114c would be required to carry or support 2G transportation to/from BTS 110a and 3G transportation to/from Nb 110b. In addition, a site that has a BTS and an Nb in the same location may exist. In such a case, a communication link 114 to that site may converge the transportation of 2G and 3G simultaneously.

Each link 114a-d may comprise one or more tunnels, which are formed of a plurality of channels. In 3G networks, the communication between the RNC 135 and the different Nbs 110a-c, over the communication links 114, may be encrypted. The communication between the MSC 140 and the RNC 135 is not encrypted. A common BSC or RNC 135 may also communicate directly with one or more MTs 120h that are located in an area (cell) served by that BSC or RNC 135.

When an MT 120 participates in a telephone call, the BSC/RNC 135 may allocate a connection from the BSC/RNC 135 to the BTS/Nb 110a-c servicing the MT 120. The allocated connection is formed as a dedicated channel, which is used only for transferring signals to and from the MT 120 to which the connection was allocated. The allocation remains in effect until the telephone call is terminated. During the call, the MT 120 converts input audio/video signals into digital signals. As the use of wireless bandwidth is very costly, the digital signals are compressed (encoded) by the MT 120, and the compressed signals are transmitted to the servicing BTS/Nb. Generally, the compressed digital signals are organized in frames with each frame comprising a header and a compressed payload.

The servicing BTS or Nbs (cell) 110a-c transfers the compressed signals as they are, without decompressing them, to the BSC or RNC 135, over bearers 114. The BSC or RNC 135 then transfers the compressed signals via a TRAU to the MSC 140. In the other direction, download transportation (audio and/or video and or computer data) from CSPP 130 to an MT 120 may be received via PSTN 150 or Internet 155 or from any other MT 120a-h. The received transportation is processed by MSC 140 and BSC or RNC 135 and may be sent toward the targeted MT 120 via one or more bearers 140a-c and one or more cells 110a-c.

Quite often, different channels or sub-channels in each one of the bearers 114a-c carries similar information around the same time or even during the same time. For example, this can readily occur when a plurality of MTs 120a-c, which are connected via the same cell 110a, surf the same web-page, or listen to the same broadcast, advertising, content information, etc. Another exemplary occasion of transmitting similar data can occur in some networks, for example in a cellular 3G network, in which a soft handoff or handover (SHO) method is used for transferring a user from one Nb 110a-c or a sector of Nb 110a-c to another Nb 110a-c or a sector within the same cell (Nb). For instance, if the system 100 is a CDMA system, then one or more cells 110a-c can comprise one or more sectors of coverage (usually three). Each sector can produce data targeted toward the same MT 120a-c via independent transmitters outputting through antennas pointed in different directions. The set of sectors, to which the terminal is currently linked to, is referred to as the "active set". For example, if cell 110a has three sectors and MT 120c is in between two of those sectors, then the same transportation toward MT 120c may be sent over two channels or sub-channels via bearers 114c, 114a and cells 110c, 110a. More information on cellular network technology and operation can be found in relevant web sites such as www.etsi.org or www.3gpp.org, the content of which are incorporated herein by reference and are considered as known to those skilled in the art.

To increase the bandwidth efficiency of a cellular fixed network 100, similar transportation can be sent once over a bearer 114a-c. It can be sent over one of the channels or sub-channels of the relevant bearer 114a-c and be removed from the other channels or sub-channels. In order to remove similar transportation from the other channels or sub-channels of a same bearer 114 and restore it on the other side of the bearer, cellular network 100 can comprise one or more pairs of multicast manipulators devices (MMD) (160a:165a) to (160c:165c). Each pair of multicast manipulators devices (160:165) can be assigned to a bearer 114. A multicast manipulator transmitter module (MMTM) 160 can be associated with the side of bearer 114 that receives download transportation. A multicast restoring module (MRM) 165 can be associated to the other side of bearer 114, which delivers the downloaded transportation to its associated cell 110.

For example, MMTM 160a is connected between cell 110c and bearer 114a. MMTM 160a receives downloaded transportation coming via cell 110c toward MTs 120a-c. MMTM 160a can process and manipulate the received download transportation. The manipulated transportation is transferred over bearer 114a and is restored by MRM 165a. The restored transportation is transferred via cell 110a toward the appropriate one or more MTs 120a-c. In an exemplary communication system (not shown in the drawing), which can carry upstream multicast communications, additional pairs of MMTMs and MRMs can be added per each bearer. The additional pair can be an inverse pair to the first pair for handling the upstream transportation.

Each MMTM 160 and MRM 165 pair may communicate with each other. There are embodiments of the present invention in which the communication can be done over a signaling and control line 136. In some embodiments of the present invention the signaling and control connection 136 can be out of band, for example over an IP network. In other embodiments of the present invention, the signaling and control line 136 can be embedded within the associated bearer 114. More information on the operation and the construction of an exemplary MMTM 160 is disclosed below in conjunction to FIGS. 2 & 4. More information on the operation and the construction of an exemplary MRM 165 is disclosed below in conjunction to FIGS. 3 & 5.

Figure 2:
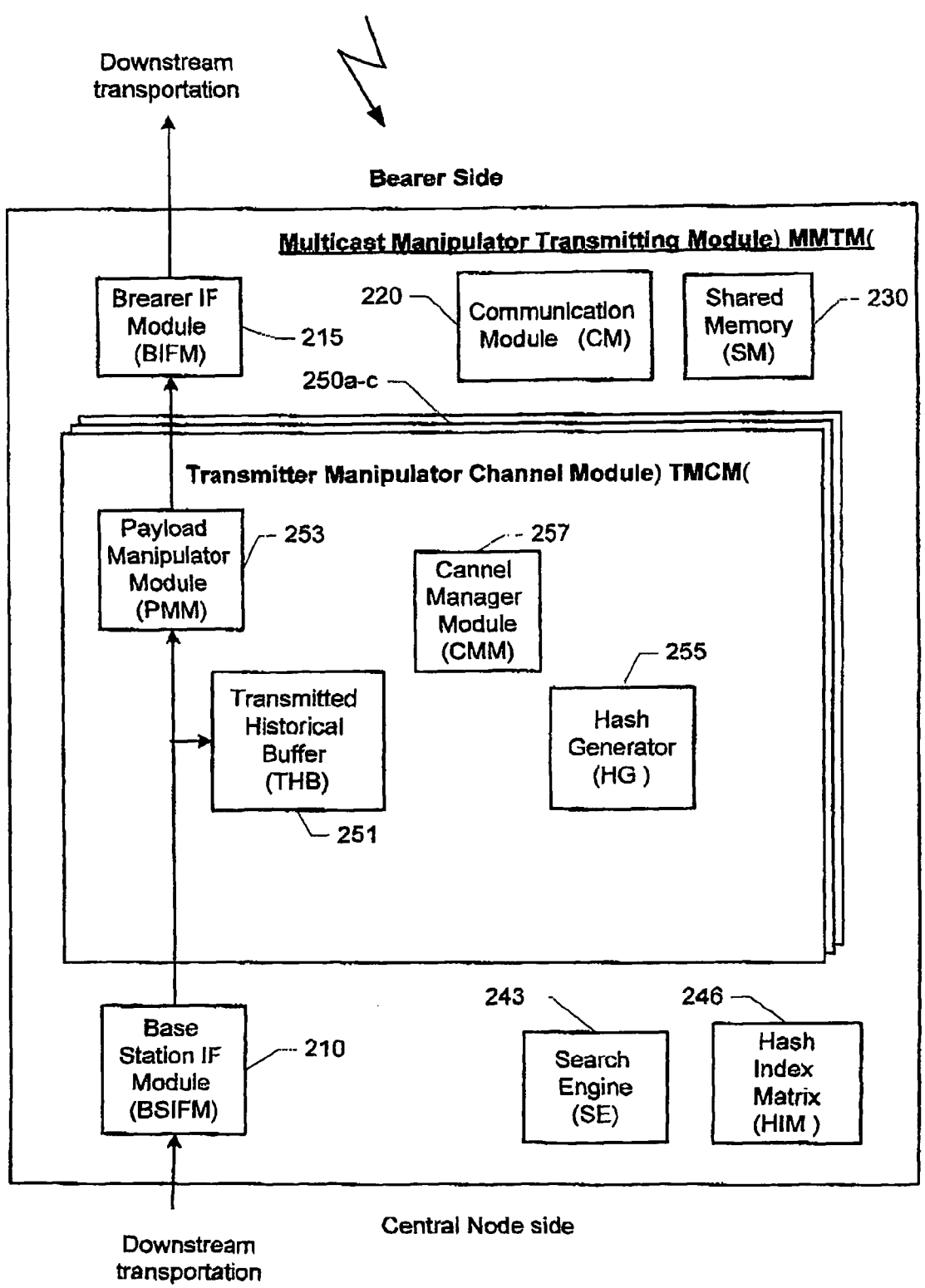
FIG. 2 schematically illustrates a block diagram with relevant elements of an exemplary Multicast Manipulator Transmitting Module (MMTM) that operates according to certain teachings of the present disclosure.

FIG. 2 illustrates a block diagram with relevant elements of an exemplary embodiment of a multicast manipulator transmitter module (MMTM) 200 that operates according to certain teachings of the present disclosure. The exemplary MMTM 200 that is illustrated in FIG. 2 can be used in a junction between a cell 110c or 135 and its bearer 114a-c (FIG. 1), for example units 160a, 160b and 160c (FIG. 1). In one exemplary embodiment, the MMTM 200 may intercept the communication between the network layer and the link layer or the physical layer of the connection between its associated cell 110a-c and its associated bearer 114a-c; process the received data and manipulate the received data in order to reduce the amount of time that similar data will be transmitted over the bearer around the same time.

An exemplary MMTM 200 may comprise a base station interface module (BSIFM) 210, a bearer interface module (BIFM) 215, a communication module 220, a shared memory module (SM) 230, a search engine (SE) 243, a hash index matrix (HIM) 246 and at least one transmitter manipulator channel module (TMCM) 250a-c.

For handling the downstream transportation of a channel or a sub-channel of the associated bearer 114, an exemplary TMCM 250a-c can comprise a transmitted historical buffer (THB) 251, a payload manipulator module (PMM) 253 a hash generator (HG) 255 and a channel manager module (CMM) 257. The SM 230 is used for storing information that is shared and used by the different modules of the MMTM 200. This information may include, but is not limited to, a connection table, queues of the different modules, the HIM 246, the one or more THBs 251 (one per each TMCM 250a-c), etc. Other exemplary embodiments of the present invention may use methods other than using the SM 230 for transferring information between the different modules of the MMTM 200. For example, each module may have its own buffer and the information for a particular module may be sent directly to the one or more buffers associated with that module via an internal bus, such as but not limited to a TDM bus, etc.

BSIFM 210 gets the downstream transportation that is transferred from its associated cell 110c or 135 (FIG. 1) towards the associated bearer 114. The BSIFM 210 receives packets (frames) and then processes the received packets according to the network communication protocol that is used over the communication link 114. A common packet may include one or more envelopes and a core (payload). The envelope can also be referred to as a header. Processing the received frame/sub-frame or packet, may comprise parsing only the header of the frame and the external envelope (if there are more than one envelope).

BSIFM 210 may initially determine whether the received information belongs to a new connection. This decision may be based on the connection ID that is associated with the frame and the information in the connection table that is stored in the SM 230. The connection ID can be one of a variety of information items including a multi-channel time slot number or a single time slot number for a TDM frame or an address for an ATM network or an IP network, a connection ID number, etc. If BSIFM 210 determines that an entry associated with the connection ID exists in the connection table, then the received frame is stored in the SM 230 and a pointer to the stored information is placed in the relevant entry in the connection table. In addition, based on the entry in the connection table, a TMCM 250a-c that is associated with the connection is defined and the pointer to the location of the packet in the SM 230 is placed in a queue of the associated TMCM 250*a-c*.

If an entry does not exist in the connection table for a particular connection ID, then this implies that the newly received packet is associated with a new connection. In this situation, the BSIFM 210 may create a new entry in the connection table to be associated with the new connection. In addition, a new TMCM 250 *a-c* may be created and associated with the new entry in the connection table. The new TMCM 250*a-c* will handle the transportation to and from an MT 120*a-c* that is associated with the new connection.

The BIFM 215 may receive a modified or non-modified payload of packets from the one or more TMCMs 250*a-c*. Then the associated entry, the one that has been associated with the relevant TMCMs 250*a-c*, in the connection table is retrieved and parsed. Based on the information from the associated entry, the BIFM 215 may reconstruct the header and/or the external envelop of the packet/frame. Reconstructing the header may require modifying the received header (envelope) to fit the modified payload. Then the modified packet is transferred toward the associated MT 120*a-c* via the associated bearer 114*a-c* (FIG. 1) and an appropriate cell 110*a-c* (FIG. 1) on the other side of the bearer. The modification of the header may affect the size field in the header, checksum field, etc.

The CM 220 is the communication interface module between the MMTM 200 and its associated MRM 165*a-c* (FIG. 1) or the different modules of CSPP 130 (FIG. 1). The communication via this interface includes control, signaling and status signals but does not include cellular transportation. The communication through the CM 220 may be conducted over an IP network, such as but not limited to a LAN, WAN, Internet, etc. In some embodiments, the communication can be performed either in band or out band. The communication between the MMTM and MRM can be carried via the signaling link 136 (FIG. 1) or over bearers 114*a-c* depending on the particular embodiment or even upon operational factors. In an exemplary embodiment of the present invention in which the transportation between a pair of MMTM and MRM is done over bearer 114*a-c*, the BSIFM 210 and BIFM 215 can be modified to transfer/receive relevant packets toward/from CM 220.

SE 243 and HIM 246 can be used for searching one or more previously received data chunks that are similar to a currently received data chunk. Each entry in an exemplary HIM 246 can be associated with a hash value and each entry may have a plurality of fields. Each field of the entry potentially includes information about a previously received chunk of data that is associated with the same hash value. The information can include its receiving time and a pointer to the location in a THB 251 in which the previously received data chunk is stored. In some embodiments of the present invention, a data chunk can be the entire payload of the packet/frame. In other embodiments a data chunk may only be a portion of a payload—a few bytes for example.

The SE 243 may receive a hash value of a currently received chunk of data from a TMCM 250 (a querying TMCM). The received hash value can be accompanied by a pointer to the location in the THB 251 of the querying TMCM 250 in which the currently received chunk is stored. The SE 243 may search the HIM 246 for an entry that is equal to the value of the received hash. If such an entry is found, the data from the entry is retrieved and be transferred to the querying TMCM. The retrieved information can include a pointer and the receiving time of one or more previously received data chunks that have the same hash value. The previously received data chunks can be associated with other TMCMs or the querying TMCM. A new field can be added to the found entry with the new field including the location of the currently received chunk in the THB 251 of the querying TMCM 250 and the receiving time.

If an entry that is equal to the value of the received hash is not found in the HIM 246, then an entry in the HIM 246 can be released. In one embodiment, the entry that has the oldest pointers is released and the new hash value with its relevant pointer and receiving time is stored as a new entry. A response to the querying TMCM may indicate that there is no similar data chunk. As a consequence, the currently received chunk can be transferred, as is, to the BIFM 215. It will be appreciated that other exemplary embodiments of the present invention may use a different method for searching the HIM 246 for a similar chunk of data. For example, instead of using a centralized matrix HIM 246, the THB 251 of each TMCM 250*a-c* may have an additional field for storing the hash value of the chunk that is stored in that entry. In such an embodiment, the SE 243 may search the hash field of each one of the THBs 251. Another exemplary embodiment of the present invention may not use any hash technique. In such an embodiment, the SE 243 may search each one of the THBs 251 looking for similar chunks. Yet in another exemplary embodiment of the present invention, each one of the TMCMs 250 may use a local search engine instead of the centralized SE 243. More information on the operation of the SE 243 and the HIM 246 is depicted below in conjunction with the description of the TMCM 250 and FIG. 4.

At this point the reader is directed to reference the TMCM 250*a-c*. A TMCM 250*a-c* can be created by a BSIFM 210 upon receiving a packet that belongs to a new connection. Once a TMCM is created, it typically will exist as long as the connection is active. When the connection becomes inactive, the resources of the relevant TMCM 250*a-c* can be released and in parallel all the fields in the HIM 246 that are related to the terminating connection can also be released. In an alternative embodiment of the present invention, an MMTM 200 may include a bank of TMCMs 250*a-c*. In such embodiments, when a packet from a new connection is received and identified, the relevant BSIFM 210 may search for a free TMCM and assign it to the new connection.

Each particular TMCM 250*a-c* can operate to improve the bandwidth utilization over the bearer 114 which carries the channel that is associated to the relevant TMCM. Improving the bandwidth utilization can be done by removing data chunks, which are similar to data chunks that were previously sent toward the bearer 114. The previous data chunk may have traveled over another connection (channel/sub-channel) that was served by another TMCM.

An exemplary TMCM 250*a-c* can include a transmitted historical buffer (THB) 251, a payload manipulator module (PMM) 253, a hash generator (HG) 255 and a channel manager module (CMM) 257. The THB 251 is used to store data chunks that were sent via the relevant TMCM 250. The THB 251 can be implemented as a cyclic buffer. Other exemplary THBs 251 can be implemented by a FIFO, for example. The THB 251 can store a plurality of consecutive data chunks. An exemplary number of stored data chunks in a THB 251 can be in the range of few tens to few thousands of chunks, for example. A currently received data chunk can be stored in the next address of the THB 251. When a new data chunk is stored in the THB 251, the oldest data chunk can be removed. In an alternate exemplary embodiment of the present invention a central THB may be used for serving a group or all of the TMCMs 250*a-c*.

An exemplary HG 255 is capable of selecting a string of bytes from the THB 251. The string of bytes can be a predefine number of bytes read from the THB 251 starting from the last received new bytes of the data chunk and continuing to the bytes of previously stored data chunks. In some embodiments of the present invention, the string of bytes can be the entire data chunk. In such embodiment, the hash value is calculated once for each received data chunk and for the entire data chunk. In an alternate exemplary embodiment, the string of bytes may have less bytes than the data chunk, while in other embodiments more bytes than the data chunk. After collecting the predefined number of bytes of the string, a hash value can be calculated in order to represent the selected string of bytes.

An exemplary HG 255 may use a cyclic redundancy check (CRC) algorithm for calculating the hash value. An alternate embodiment of the HG 255 may calculate a checksum word for representing the string of bytes. Still other embodiments may use other hash algorithms that can generate a hash value having less bytes than the selected string of bytes. Upon receiving additional bytes of the data chunk, the HG 255 may calculate another hash value for the string of bytes that starts from the newer received bytes. By using such a "humming window" method the exemplary HG 255 may create two or more hash values for each received chunk of data, wherein each hash value is calculated for shifted received bytes of one or more data chunks.

One or more hash values that are related to a received data chunk are transferred to the SE 243 for searching for similar data chunks. Each hash value can be accompanied with a pointer to the location of the relevant string of data in the appropriate THB 251. The results of the search can be transferred to the CMM 257. The CMM 257 may receive the results of the search from the SE 243; processes the results and may reach a decision as to how to modify the transportation over the associated channel.

Based on the decision, the CMM 257 may instruct the PMM 253 how to manipulate the data. Some of the decisions that can be made by CMM 257 are provided by way of example. In one instance, if the results of the search indicate that the SE 243 did not find an entry in the HIM 246 that is relevant to the hash value that was calculated by HG 255, then the CMM 257 may instruct the PMM 253 to transfer the data as is without modification.

As another example, if an entry in the HIM 246 is found by the SE 243, then the SE 243 may provide the location in one or more THBs 251 at which a similar data chunk that was previously received via their associated channel/sub-channel may be found. The location information may be provided in the form of a pointer to the beginning of the THB 251 and the offset at which the selected string starts. For each selected string that has the same hash value, the CMM 257 may retrieve the appropriately selected string and compare it to the currently received string in order to define a most similar string to the currently received string of bytes. If the most similar string has the same data as the currently received string, an identical string, then the CMM 257 may instruct the PMM 253 to drop the received data string and instead to add resorting information. The resorting information may include the channel/sub-channel ID number that is associated to the TMCM 250 that included the THB 251 that stores the most like string, and the offset of the beginning of the most like string from the beginning of THB 251.

If the most-like string is not identical to the currently received string, then the difference between the two strings can be calculated. The CMM 257 may instruct the PMM 253 to drop the received data string and instead to add restoring information. The restoring information may include the channel/sub-channel ID number that is associated to the TMCM 250 that included the THB 251 that stores the most like string (a reference channel); the offset of the relevant bytes of the most like string from the beginning of the THB 251; and the difference between the current string and the most like string.

Usually, the difference between these strings is typically small. This technique enables the information to be communicated using a smaller number of bits by simply representing the differences. In such an embodiment, restoring information can be used to indicate whether the packet has been modified or not. The differences between the currently received string and the most-like string can be organized in several fields in the restoring information. For example, the first field may define the location with the offset of the most-like string in the relevant THB 251. The second field may define the number of bytes that are not the same in both strings. The following one or more fields may include the location of the dissimilar bytes in the string followed by the difference.

In an exemplary embodiment of the present invention, the CMM 257 can be capable of determining whether two different channels/sub-channels carry the same information (for soft hand over, or multicast, for example). Such a CMM may be adapted to monitor the behavior of consecutive currently received data chunks and their associated most-like strings. If the most-like strings always belong to a certain THB 251 (to a certain channel/sub-channel); and if each one of the most-like strings is identical to its relevant currently received data chunks; and if the most-like strings are stored in consecutive locations in the certain THB 251, then the CMM 257 may determine that both channels carry the same data (multicast channels).

Upon reaching a multicast decision, the CMM 257 may instruct the PMM 253 to drop the received data string and to add multicast restoring information. In addition, the PMM 253 can be instructed to drop any following received data chunks until receiving new instructions. The multicast restoring information may include the channel/sub-channel ID number associated with the TMCM 250 that included the certain THB 251, which stores the most-like string, and the offset to the beginning of the most-like string from the beginning of the certain THB 251. This channel/sub-channel will be referred to as the "multicast channel" or the "reference channel". The terms "multicast channel" and "reference channel" can be used interchangeably. In addition, the restoring information may include instructions to create consecutive packets or frames according to the transition rate over bearer 114. Each created packet will copy data from consecutive locations in the historical buffer of the receiving side of the "multicast channel". These created consecutive packets will replace the packets that have been dropped by the PMM 253.

In addition to making decisions about the type of modification that can be executed, the CMM 257 may be capable of communicating with its associated Receiving Channel Manager Module (RCMM) to check whether the two historical buffers (at both ends of the connection) are synchronized. If the historical buffers are not synchronized, the CMM and a receiving channel manager module (RCMM) can operate to synchronize the two non-synchronized historical buffers. The synchronization can be verified periodically and/or according to the data transportation. For example, once per a certain amount of number of data chunks, which have been transferred over the connection, or upon the detection of an error, etc. In one exemplary embodiment of the present invention, synchronization may be done by selecting a group of addresses. The data in each address of the group in both historical buffers is compared. If the data is the same, the two historical buffers on both ends of the channel are synchronized. If the data is not the same, the historical buffers on both ends are released, fields in the HIM 246 that are related to that channel are also released and the process starts from the beginning. Alternatively, if the two historical buffers are not synchronized, the PMM 253 can be instructed to transfer the data as is for the rest to the time that the connection exists and the THB 251, HG 255 and CMM 257 may sleep until the connection is terminated.

The PMM 253 may operate to receive data chunks and hold them until a decision as to how to handle them is made by the CMM 253. Upon receiving instructions on how to handle the data, the PMM 253 may retrieve the received data chunk, remove the appropriate fields, add new fields with restoring instructions and transmit the modified data chunk to the BIFM 215. More information on the operation of the MMTM 200 is depicted below in conjunction with FIG. 4.

Figure 3:
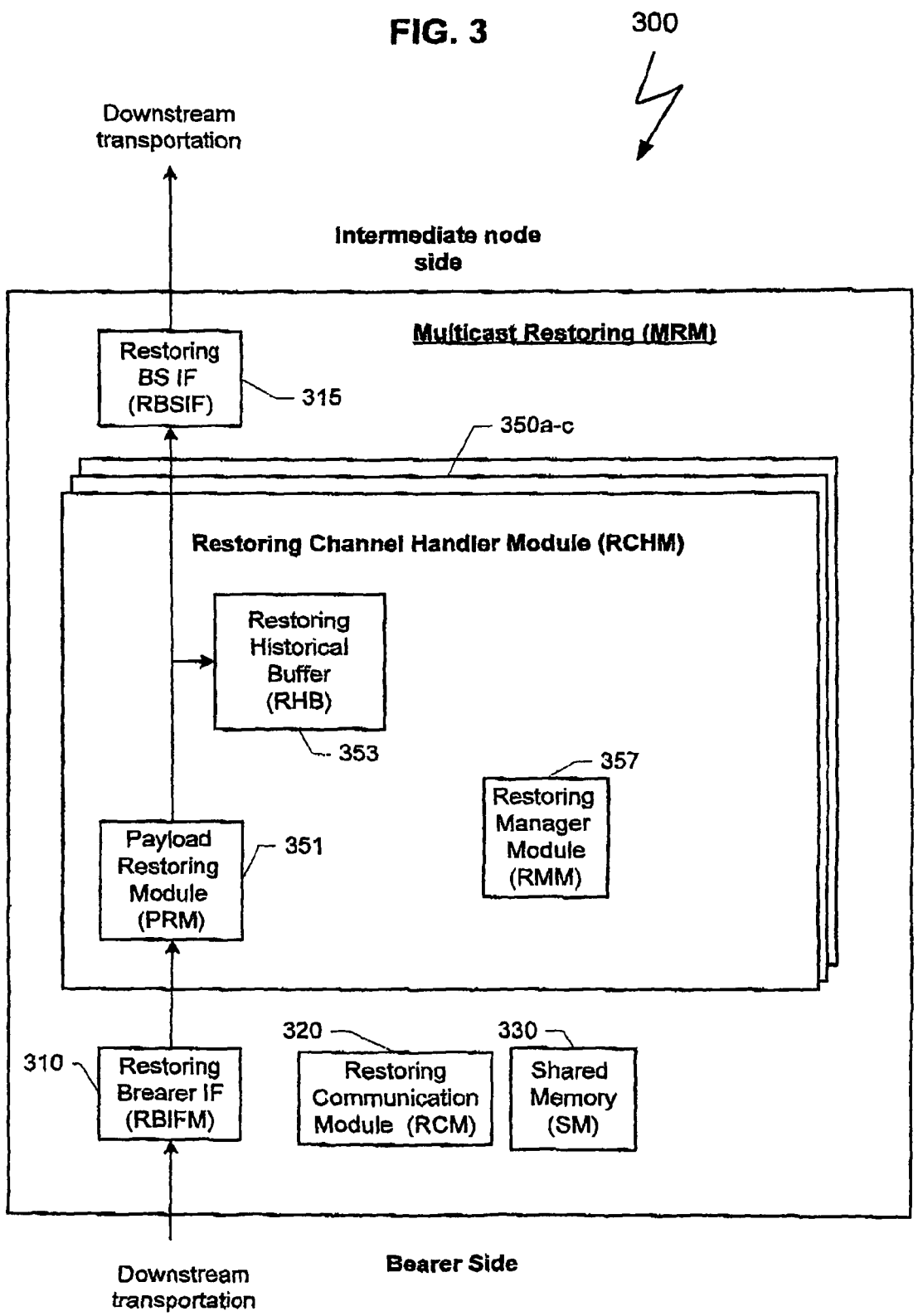
FIG. 3 schematically illustrates a block diagram with relevant elements of an exemplary Multicast Restoring module (MRM) that operates according to certain teachings of the present disclosure.

FIG. 3 illustrates a block diagram with relevant elements of an exemplary embodiment of a multicast restoring module (MRM) 300 that operates according to certain teachings of the present disclosure. The exemplary MRM 300 that is illustrated in FIG. 3 can be used in a junction between a bearer 114a-c (FIG. 1) and its associated cell 110a-c or 135, for example units 165a, 165b and 165c (FIG. 1). The MRM 300 may intercept the communication between the network layer and the link layer or the physical layer of the connection between its associated bearer 114a-c and it associated cell 110a-c; process the received data and restore the received data in order to create a similar packet/frame to the one that has been manipulated at the other side of bearer 114a-c by an associated MMTM 160a-c (FIG. 1).

An exemplary MRM 300 may comprise a restoring bearer interface module (RBIFM) 310, a restoring base station interface module (RBBIF) 315, a restoring communication module (RCM) 320, a shared memory module (SM) 330 and at least one restoring channel handle module (RCHM) 350a-c. For restoring the downstream transportation of a channel or a sub-channel of the associated bearer 114, an exemplary RCHM 350a-c can comprise a payload restoring module (PRM) 351, a restoring historical buffer (RHB) 353, and a restoring manager module (RMM) 357. The operation of each one of the SM 330, RCM 320, RBIFM 310, RBSIF 315 and RHB 353 can be understood from the description of the operation of the SM 230, RCM 220, BSIFM 210, BIFM 215 and THB 251 (respectively), which have been depicted above in conjunction with FIG. 2 and therefore SM 330, RCM 320, RBIFM 310, and RBSIF 315 are not further described.

An exemplary RCHM 350a-c can be created by an RBIFM 310 upon receiving a packet that belongs to a new connection. Once an RCHM 350a-c is created, it typically will exist as long as the connection is active. When the connection becomes inactive, the resources of the relevant RCHM 350a-c can be released. In an alternate embodiment of the present invention, an MRM 300 may include an RCHM bank 350a-c. In such embodiments, when a packet from a new connection is received and is identified, the relevant RBIFM 310 may search for a free RCHM 350a-c and assign it to the new connection.

Upon its initiation the newer RCHM 350 can be introduced to its associated TMCM 250 (FIG. 2), which manipulates the transportation over the new connection. During the introducing period, RMM 357 and its associated CMM 257 may synchronize their historical buffers, RHB 353 and THB 251 (respectively). In addition, RMM 357 and its associated CMM 257 may decide on the synchronization method that is used to verify that the two historical buffers are synchronized. In an exemplary embodiment, the decision can define the period between consecutive synchronization processes; addresses of the historical buffer for which their content will be compared, etc. The decision can be based on information that is related to the interference over the bearer 114, the load over the bearer, for example.

Each particular RCHM 350a-c can operate to restore manipulated packets/frames that have been manipulated by its associated TMCM 250. The PRM 351 can be capable of receiving a manipulated payload of packets/frames from RBIFM 310 and then parse the manipulated payload and determine whether the payload has been manipulated. If the payload was not manipulated, it can be stored in the next location in the RHB 353 and then transferred toward the RBSIF 315. If the payload was manipulated, then the restoring information can be parsed and accordingly the payload is restored. For example, when the restoring information indicates that a most-like string, which was used for manipulating the original payload, is identical to the string that has been manipulated, then a replication of the most-like string is fetched from the appropriate location in the appropriate the RHB 353. The fetched replication is placed as the restored payload instead of the restoring information. The restored payload is stored in the RHB 353 and is transferred toward the RBSIF 315. Fetching the replication of the most-like string, from the appropriate RHB 353, can be based the channel/sub-channel ID number that is associated with the TMCM 250 that includes the THB 251, which stores the most-like string, and the offset of the beginning of the most like string from the beginning of the THB 251. This information can be a part of the restoring information.

When the restoring information indicates that the most-like string is not identical to the manipulated string, then the replication of the most-like string can be fetched, from the appropriate RHB 353, by using the location information as it is depicted in the above example. The restoring information is parsed in order to restore each one of the bytes that are not identical to the original bytes. The differences (which are also part of the restoring information) are added to the different bytes of the replication of the most-like string in order to create the restored payload. The restored payload is stored in the RHB 353 and is then transferred to the RBSIF 315.

If the restoring information is multicast restoring information, then based on the channel ID of the "multicast channel", the appropriate RHB 353, as well as the offset from the beginning of the RHB 353 to the replication of first payload are defined. The replication of first payload is copied as the first restored payload and is then stored in the RHB 353 and transferred to the RBSIF 315. In parallel to this, a timer can be set according to a frame rate that is used over bearer 114 (FIG. 1). For each period of the timer, the PRM 351 may retrieve consecutive payloads from the RHB 353 of the "multicast channel" and deliver it as the next restored payload. This process can continue until another instruction arrives at the PRM 351.

In an alternate exemplary embodiment of the present invention, the relevant PMM 253 (FIG. 2) in manipulating consecutive payloads of multicast channel, may transfer just an indication that a next multicast packet is received without additional information. Upon receiving this indication, the PRM 351 may copy the replication of the next payload from the "multicast Channel" RHB 353 and restore the next multicast payload. In such an embodiment a timer is not needed.

The RCM 357 can be capable of communicating with its associated CMM 257 in order to check whether the two historical buffers (at both ends of the connection) are synchronized as it is depicted above in conjunction with CMM 257. More information on the operation of MRM 300 is depicted below in conjunction with FIG. 5.

Figure 4:
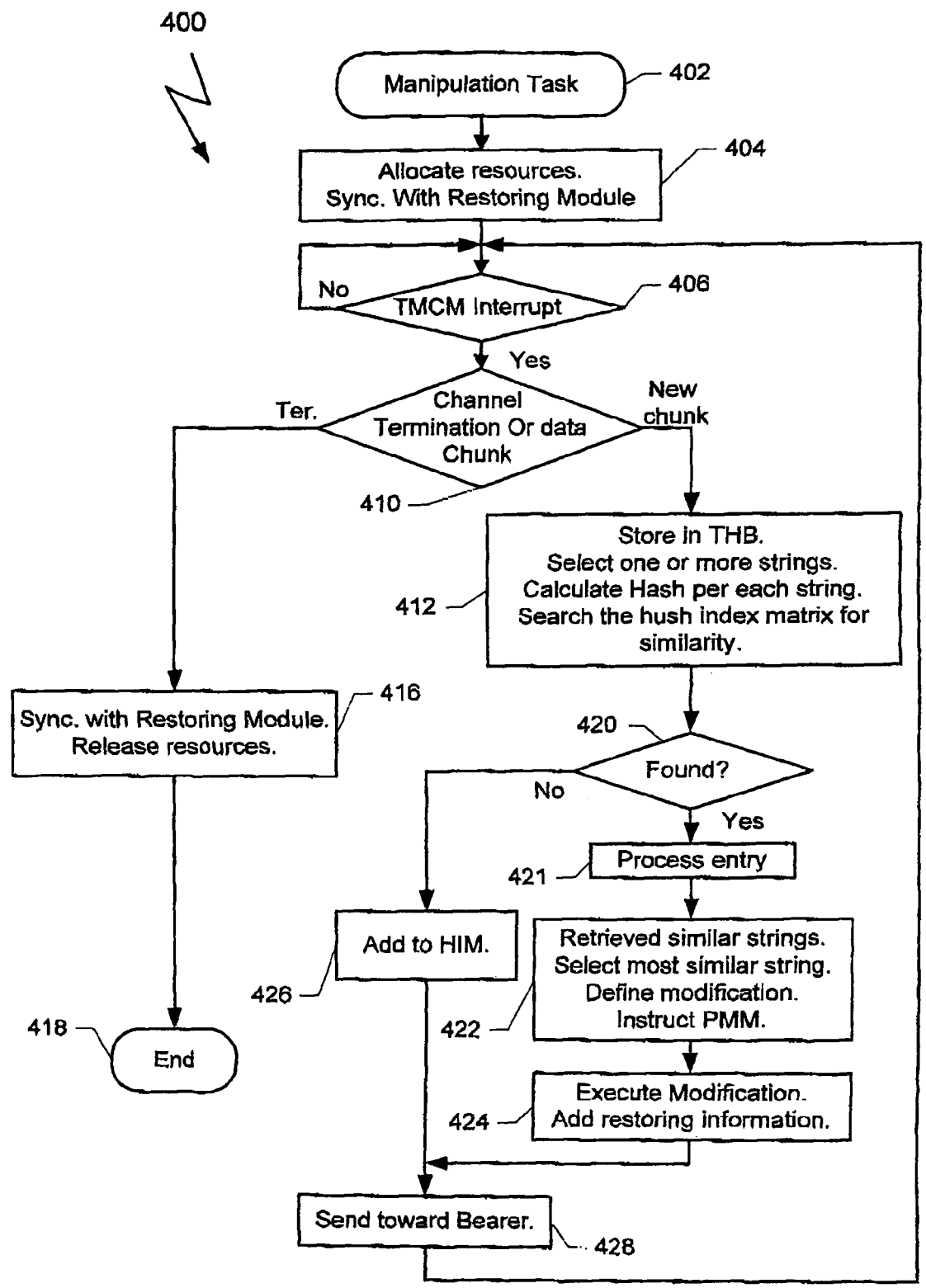
FIG. 4 illustrates a flowchart showing relevant steps of an exemplary embodiment of a process for handling downstream transportation at an exemplary transmitting module.

FIG. 4 is a flow diagram illustrating the steps involved in an exemplary manipulation task 400 performed by an exemplary TMCM 250a-c (FIG. 2). The exemplary manipulation task 400 can be executed by each TMCM 250a-c for reducing the number of bits that are transmitted over its associated channel in bearer 114 (FIG. 1). The manipulation task 400 may use one or more methods for manipulating the transportation over bearer 114. Methods such as, but not limited to the methods that were described above in conjunction with the description of TMCM 250a-c (FIG. 2). As is described above, the manipulation task 400 may be initiated 402 by the BSIFM 210 (FIG. 2) when a new connection is established over bearer 114. Upon initiation, manipulation task 400 may receive information identifying relevant queues in the SM 230 (FIG. 2) that can be used during the operation of task 400. Exemplary queues can include the queue of the SE 243 (FIG. 2), the BIFM 215, and the HG 255. In addition, the new TMCM 250a-c can be introduced 404 to its associated RCHM 350a-c (FIG. 3) on the other side of the bearer. The introducing process be performed over the signaling line 136 (FIG. 1), for example. During the introducing period, among other activities, the two historical buffers, the THB 251 (FIG. 2) and the RHB 353 (FIG. 3), can be synchronized.

After completing the initiation steps 402 and 404, the manipulation task 400 may wait 406 for a next TMCM 250a-c interrupt. A received interrupt is parsed and a decision is made 410 as to whether the interrupt is a connection termination instruction or the reception of a new chunk of data. If the received interrupt is a termination instruction 416, a termination indication is sent toward the associated RCHM 350a-c and resources that are related to the relevant TMCM 250 are released. Resources such as, but not limited storage resources in the SM 230 that were allocated to the relevant THB 251, and fields in the HIM 246 that point to locations in the THB 251. In addition, computing resources of the TMCM 250 can also be released and then the method 400 can be terminated 418.

If at decision block 410 it is determined that the received interrupt is a currently received data chunk, processing continues at step 412. A chunk of data can have a few bytes or up to a few hundreds of bytes, for example. It can be an entire payload of a packet or a frame; a portion of a payload, or a sub-frame. The current received data chunk can be stored 412 in the next address of the THB 251 (FIG. 2) instead of the oldest stored data chunk (i.e. a first in first out structure). In parallel, the current received data chunk can be transferred and stored in a waiting buffer of the PMM 253 (FIG. 2) until manipulation instructions are delivered to PMM 253.

After storing the currently received data chunk, one or more strings of bytes from the THB 251 can be selected. A string of bytes can be a predefined number of bytes from the THB 251 starting from the received new bytes of the data chunk and continuing to bytes of previous stored data chunks. In some embodiments of the present invention the string of bytes can be the entire data chunk. For each selected string, a hash value that represents the string is calculated by the HG 255 (FIG. 2). The following search process can be preformed several times—once per each previously calculated hash value. In one exemplary embodiment of the present invention, the several times of performing the steps 420 to 428 can be performed in parallel. In other embodiments, the steps can be done in a loop, one after the other.

For each calculated hash value, the HIM 246 (FIG. 2) is searched by the SE 243 (FIG. 2) in order to find an entry that is equal to the calculated hash value. If 420 an entry is not found, a new entry is added 426 to the HIM 246 and the oldest entry of HIM 246 can be released. The calculated hash value is stored in the new entry with a pointer to the location of the string, for which the hash value was calculated. The location points the relevant THB 251 and the offset from the beginning of the TBH 251 in which the beginning of the string is stored. An additional field can be allocated to the receiving time. After storing the hash value, the PMM 253 can be instructed to transfer the chunk, as is, without modification to the BIFM 215 (FIG. 2) to be sent 428 toward the bearer.

If an entry that has the same hash value has been found 420, then the content of the entry is parsed 421 and a list with one or more pointers to the one or more similar strings, which have the same hash value, can be transferred to the relevant CMM 257 for further processing. Each one of the similar strings can be retrieved 422 by the CMM 257 and be compared to the currently received string in order to select a most-similar string to the currently received string of bytes. After selecting the most-like string, a decision can be made 422 as to how to manipulate the currently received chunk. For example, if the most-similar string has the same data as the current string, an identical string, then the CMM 257 may instruct its associated PMM 253 to drop the received data string and instead, to add restoring information.

Upon receiving the instruction, PMM 253 may retrieve the relevant payload from its waiting buffer; manipulate the payload 424 by dropping the content of the payload and writing the restoring information instead. The restoring information may include the channel/sub-channel ID number and the offset of the beginning of the most-like string from the beginning of its THB 251. The ID number is associated with the TMCM 250 that included the THB 251 that stores the most-like string. The manipulated payload is transferred 428 toward the BIFM 210 (FIG. 2) and from there over the bearer 114 (FIG. 1) to the associated RCHM 350a-c (FIG. 3). Other exemplary types of manipulations can be done by method 400, such as the ones that were depicted above in conjunction with FIG. 2, for example. Processing 400 then waits for the next interrupt to be received.

Figure 5:
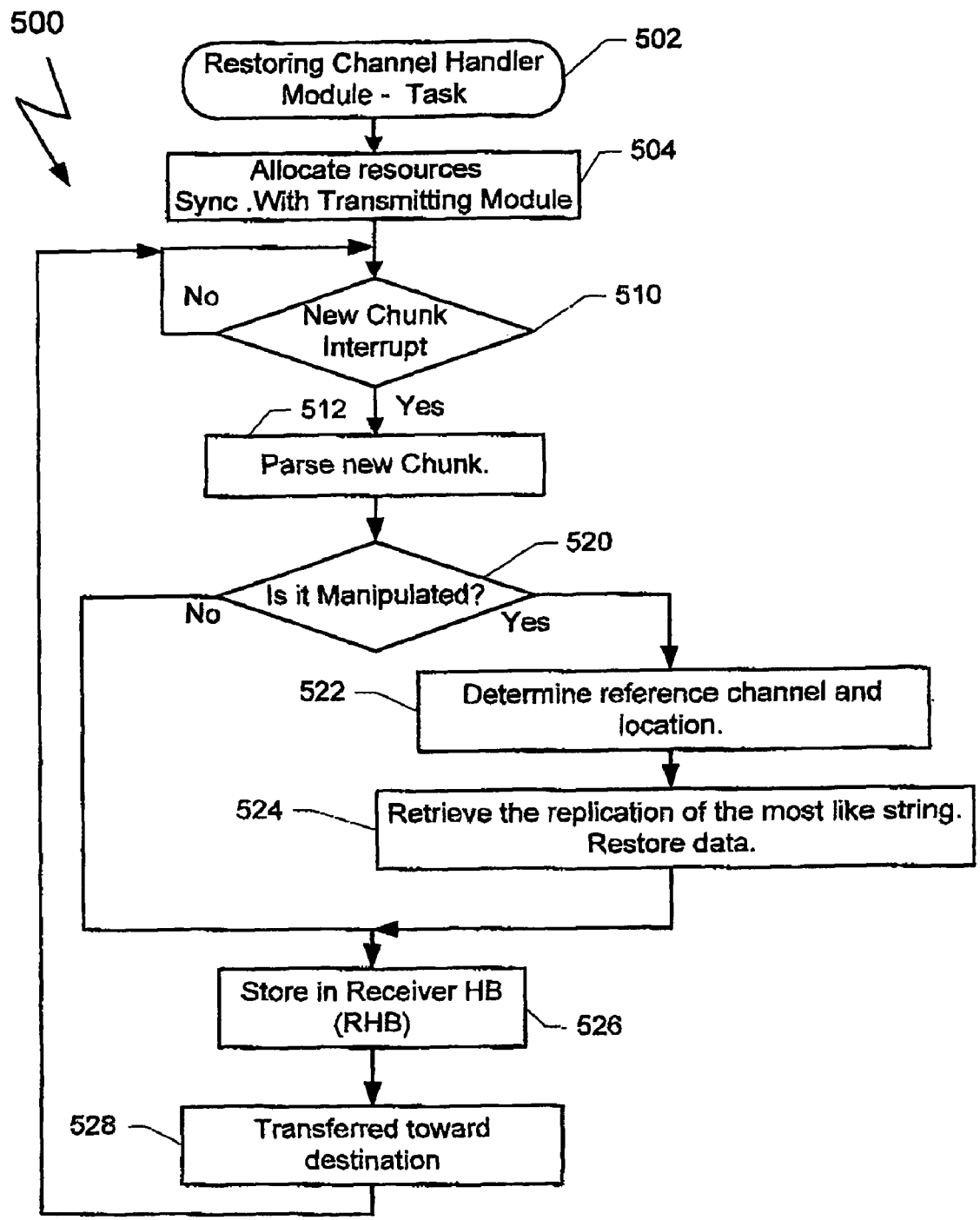
FIG. 5 illustrates a flowchart showing relevant steps of an exemplary embodiment of a process for handling downstream transportation at an exemplary restoring module.

FIG. 5 illustrates a flow diagram with the relevant steps that are involved in an exemplary restoring task 500. The Restoring task 500 can be performed by an exemplary RCHM 350a-c (FIG. 3). The exemplary Restoring task 500 can be executed by each RCHM 350a-c for restoring manipulated payloads of received packets where the packets were transmitted over its associated channel in bearer 114 (FIG. 1). The restoring can be done before transferring the packets to the associated base station 110a-c (FIG. 1). The RCHM 350a-c may use one or more methods for restoring the transportation over bearer 114, depending on the restoring information that is relevant to the manipulated payload. Methods such as, but not limited to the methods that were described above in conjunction with the description of RCHM 350a-c (FIG. 3), can be used by method 500.

As is described above, the restoring task 500 may be initiated 502 by the RBIFM 310 (FIG. 3) when a new connection is established over bearer 114. Upon initiation, restoring task 500 may receive information identifying relevant queues in the SM 330 (FIG. 3) that can be used during the operation of task 500, the queue of the RBSIF 315 (FIG. 3), for example. In addition, the new RCHM 350a-c can be introduced 504 to its associated TMCM 250a-c (FIG. 2) on the other side of the bearer. The introduction can be done over the signaling line 136 (FIG. 1), for example. During the introduction ("handshake") period, among other activities, the two historical buffers, the THB 251 (FIG. 2) and the RHB 353 (FIG. 3), can be synchronized.

After the initiation steps 502 and 504, the restoring task 500 may wait 510 for a new chunk interrupt. Based on the received new chunk interrupt, the received new chunk of data is retrieved from the SM 330 (FIG. 3) and parsed 512 by the PRM 351 (FIG. 3). A decision can be made 520 whether the data of the payload has been manipulated. The decision can be based on a tag (a field in one of the fields in the payload) that was added by the associated PMM 253 (FIG. 2), for example. If 520 the data chunk was not manipulated, then the data chunk is stored 526 in the next address of the RHB 353 (FIG. 3) while releasing the oldest stored data. In parallel, the data payload is transferred 528 to the queue of the RBSIF 315 (FIG. 3) to be handled according to the communication protocol between the bearer and the base station. Then the restoring chunk is sent toward an associated user 120 (FIG. 1) via the associated base station 110 (FIG. 1). After transferring 528 the restored data chunk to the RBSIF 315, method 500 returns to step 510 waiting for the next interrupt.

If 520 the data chunk was manipulated, then the restoring information can be parsed and a decision can be made 522 which channel/sub-channel carries the replication of the most-like string (a reference channel) and in which address of the RHB 353 (FIG. 3), which is associated with the reference channel, the replication of the most-like string is stored. Then a replication of the most-like string is fetched 524 from the appropriate location in the appropriate RHB 353. The restoring procedure is preformed on the fetched replication of the most like string. The restoring procedure depends on the restoring information that is relevant to the manipulated chunk. For example, when the restoring information indicates that a most-like string, which was used for manipulating the original payload, is identical to the string that has been manipulated, then the fetched replication is placed, as is, as the restored data chunk instead of the restoring information. The restored data chunk is stored 526 in the RHB 353 and in parallel, a copy of the restoring data chunk is transferred 528 toward RBSIF 315 (FIG. 3).

Another exemplary restoring procedure 524 can be executed when the resorting information indicates that the most-like string is not identical to the manipulated string, then the restoring information is parsed in order to restore each one of the bytes (or word, group of bytes) that are not identical to the original bytes. The differences (which are also part of the restoring information) are added to the non-identical bytes of the replication of the most-like string in order to create the restored data chunk.

Yet an alternate restoring procedure 524 can be implemented upon receiving a first manipulated data chunk of which its restoring information includes multicast instructions. The multicast instruction can define the reference channel as a "multicast channel" and the difference in offset values from the beginning of the RHB 353, of the two channels—the current one (the one that currently uses the method 500) and the reference channel. Based on the offset information, the replication of the first payload is copied from the RHB 353 of the reference channel and replaces the restoring information as the first restored payload. The first restored payload is stored 526 in the RHB 353 (FIG. 3) and is transferred 528 to the RBSIF 315.

After transferring the restored data, a timer can be set according to a frame rate that is used over bearer 114 (FIG. 1) and for each period of the timer, method 500 may execute steps 524 to 528 on consecutive payloads from the RHB 353 of the "reference channel" and deliver it as the next restored payload. This process can continue until another instruction arrives at the PRM 351.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein. Rather the scope of the invention is defined by the claims that follow.

What is claimed is:

1. A method that reduces the number of bits that are transferred via a channel/sub-channel over a communication link that carries a plurality of channels/sub-channels, wherein each channel/sub-channel is associated with a different connection and wherein the communication content is organized in data units, the method comprising the actions of:

receiving, at a transmitting node at the ingress of a communication link, a plurality of data units that are associated with the plurality of channels/sub-channels, wherein the plurality of channels/sub-channels are carried over the communication link between the transmitting node and a receiving node;

for each data unit, identifying the channel/sub-channel that the data unit is associated with and storing each of the data units of the received plurality of data units into a historic memory module that is associated with the same channel/sub-channel as the received data unit;

examining one or more consecutively received data units of a particular channel/sub-channel to identify similar one or more previously received data units, wherein the similar one or more previously received data units were received over a channel/sub-channel other than the particular channel/sub-channel;

modifying the one or more consecutively received data units, of the particular channel/sub-channel, based on the similar one or more previously received data units received over the channel/sub-channel other than the particular channel/sub-channel; and transmitting the modified one or more data units over the particular channel/sub-channel via the communication link;

wherein the modified one or more data units has fewer bits than the number of bits comprised in said one or more consecutively received data units.

2. The method of claim 1, wherein a historic memory module is implemented as a cyclic buffer, and the action of storing each of the data units of the received plurality of data units into the historic memory module that is associated with the same channel/sub-channel as the received data unit further comprising removing the oldest entry.

3. The method of claim 1, wherein the action of modifying the one or more consecutively received data units comprises inserting restoring information into the data units.

4. The method of claim 3, wherein the action of inserting restoring information into the data units further comprises inserting information that defines the location of the similar one or more previously received data units in the historic memory module, which stores the similar one or more previously received data units, and the difference between the one or more consecutively received data units and the similar one or more previously received data units.

5. The method of claim 1, wherein the action of receiving a plurality of data units further comprises calculating a plurality of hash values that represent the received plurality of data units and storing the plurality of hash values in a hash memory module; and wherein the action of storing the plurality of hash values in the hash memory module further comprises, for each entry in the hash memory module, storing an hash value and one or more pointers, each pointer points to a location in a historic memory module in which a received one or more data units associated with the hash value are stored.

6. The method of claim 5, wherein the action of examining the one or more consecutively received data units is based on the calculated plurality of hash values.

7. The method of claim 5, wherein the hash memory module is implemented by a cyclic buffer and the action of storing the plurality of hash values in a hash memory module further comprises removing the oldest entry.

8. The method of claim 5, wherein the hash memory module is implemented by a hash index matrix and the action of storing the plurality of hash values in a hash memory module further comprises modifying an associated entry in the hash index matrix.

9. The method of claim 1, wherein the communication link is a segment of a cellular fixed network and the action of receiving a plurality of data units further comprises receiving data units formatted in accordance with the cellular protocol.

10. The method of claim 9, wherein a channel/sub-channel is associated with a particular mobile device and the action of examining one or more consecutively received data units of a particular channel/sub-channel further comprises examining one or more consecutively received data units of the particular mobile device.

11. The method of claim 1, further comprising the actions of:
receiving the modified one or more data units that were sent over the particular communication link;
restoring the modified one or more data units;
storing the restored one or more data units in a restoring historic memory module that is associated with the same channel/sub-channel as the received modified one or more data units; and
transferring the restored one or more data units toward a destination.

12. The method of claim 11, further comprising the action of synchronizing the historic memory module and the restoring historic memory module of the same channel/sub-channel.

13. The method of claim 1, wherein the examining action further comprising identifying the other channel/sub-channel as a multicast channel.

14. The method of claim 13, wherein the action of modifying the one or more consecutively received data units further comprises dropping the content of the consecutive one or more data units.

15. In a multi-channel network which transports data units over a plurality of channels/sub-channels carried over a communication link between two nodes, a system that reduces the traffic volume on a channel/sub-channel basis, the system comprising:
a transmitting module located at a transmitting side of the communication link; and
a receiving module located at a receiving side of the communication link;
the transmitting module including:
a hash index matrix (HIM);
a search engine;
a plurality of transmitter manipulator channel modules (TMCM) wherein each of the plurality of TMCM is associated with a particular channel/sub-channel and each TMCM comprises:
(i) a transmitted historical buffer that stores data units recently received over the associated particular channel/sub-channel;
(ii) a hash generator that generates a hash value based on the content of a currently received data unit for the particular channel/sub-channel, associates the calculated hash value with information on the location in the transmitted historical buffer in which the data unit is stored and the relevant TMCM, and transfers the hash value to the search engine;
(iii) a payload manipulator module;
wherein the search engine that receives the calculated hash value with information on the location in the transmitted historical buffer in which the data unit is stored and the relevant TMCM; searches the HIM for an entry storing previously generated hash values for previously received similar one or more data units if found, then transfers information on the previously received data unit to the payload manipulator module of the relevant TMCM, if not found then store, in a new entry of the HIM, the calculated hash value with information on the location in the transmitted historical buffer in which data unit is stored, and the relevant TMCM; and
wherein the payload manipulator module of the relevant TMCM modifies the currently received data unit based on the content and the location of the previously received similar one or more data units, which were previously received over a channel/sub-channel other than the particular channel/sub-channel associated with the relevant TMCM, and transfers the modified currently received data unit toward a connection interface for transmitting the modified currently received data unit; and
the receiving module including:
a restoring module for restoring the modified currently received data unit.

16. The system of claim 15, wherein the restoring module comprises a plurality of restoring channel modules (RCM), wherein each RCM is associated with a channel/sub-channel.

17. The system of claim 15, wherein each of the plurality of RCM further comprises:

a payload restoring module that upon determining that the modified currently received data unit includes information identifying a previously received data unit and information identifying the difference between the previously received data unit the currently received data unit, restoring the modified currently received data to its original state by extracting data from a previously received data unit and modifying it in accordance with the difference information.

* * * * *